US009631084B2

(12) United States Patent
Chapman et al.

(10) Patent No.: US 9,631,084 B2
(45) Date of Patent: Apr. 25, 2017

(54) ELASTOMERIC FORMULATIONS USEFUL IN FILMS AND SHEETS

(71) Applicant: KURARAY AMERICA, INC., Houston, TX (US)

(72) Inventors: Brian K. Chapman, Houston, TX (US); Heith A. Foster, Friendswood, TX (US)

(73) Assignee: KURARAY AMERICA, INC., Houston, TX (US)

( * ) Notice: Subject to any disclaimer, the term of this patent is extended or adjusted under 35 U.S.C. 154(b) by 0 days.

(21) Appl. No.: 14/664,470

(22) Filed: Mar. 20, 2015

(65) Prior Publication Data
US 2015/0191591 A1 Jul. 9, 2015

Related U.S. Application Data

(63) Continuation of application No. 13/396,107, filed on Feb. 14, 2012, now Pat. No. 9,056,975.

(60) Provisional application No. 61/442,593, filed on Feb. 14, 2011.

(51) Int. Cl.
*C08J 5/18* (2006.01)
*C08L 53/00* (2006.01)

(52) U.S. Cl.
CPC .............. *C08L 53/00* (2013.01); *C08J 5/18* (2013.01); *C08L 53/005* (2013.01); *C08J 2325/08* (2013.01); *C08J 2353/00* (2013.01); *C08J 2425/06* (2013.01)

(58) Field of Classification Search
CPC ........ C08L 53/00; C08L 53/02; C08L 53/005; C08K 5/01; C08J 5/18; C08J 2325/08
USPC .................. 524/505; 428/220, 318
See application file for complete search history.

(56) References Cited

U.S. PATENT DOCUMENTS

| | | | |
|---|---|---|---|
| 4,413,098 A | 11/1983 | Hattori et al. | |
| 4,892,903 A | 1/1990 | Himes | |
| 4,897,194 A | 1/1990 | Olson | |
| 5,254,653 A | 10/1993 | Halasa et al. | |
| 5,272,220 A | 12/1993 | Rodgers et al. | |
| 5,284,927 A | 2/1994 | Hsu et al. | |
| 5,317,062 A | 5/1994 | Rodgers et al. | |
| 5,342,858 A | 8/1994 | Litchholt | |
| 5,422,172 A | 6/1995 | Wu | |
| 5,633,286 A | 5/1997 | Chen | |
| 5,760,117 A | 6/1998 | Chen | |
| 5,861,074 A | 1/1999 | Wu | |
| 5,914,378 A | 6/1999 | Viola et al. | |
| 5,916,959 A | 6/1999 | Lindquist et al. | |
| 5,962,572 A | 10/1999 | Chen | |
| 5,994,450 A | 11/1999 | Pearce | |
| 6,013,151 A | 1/2000 | Wu et al. | |
| 6,117,176 A | 9/2000 | Chen | |
| 6,143,798 A | 11/2000 | Jensen et al. | |
| 6,148,830 A | 11/2000 | Chen | |
| 6,324,703 B1 | 12/2001 | Chen | |
| 6,333,374 B1 | 12/2001 | Chen | |
| 6,365,645 B1 | 4/2002 | Cinelli et al. | |
| 6,369,126 B1 | 4/2002 | Cinelli et al. | |
| 6,410,129 B2* | 6/2002 | Zhang ..................... C08L 53/02 428/198 |
| 6,410,624 B1 | 6/2002 | Maly et al. | |
| 6,420,475 B1 | 7/2002 | Chen | |
| 6,433,069 B1 | 8/2002 | Oeltjen et al. | |
| 6,472,084 B1 | 10/2002 | Middlesworth et al. | |
| 6,498,198 B2 | 12/2002 | Pearce | |
| 6,552,109 B1 | 4/2003 | Chen | |
| 6,623,586 B2 | 9/2003 | Mortellite et al. | |
| 6,630,532 B1 | 10/2003 | Eiden | |
| 6,656,581 B2 | 12/2003 | Wu et al. | |
| 6,797,765 B2 | 9/2004 | Pearce | |
| 6,867,253 B1 | 3/2005 | Chen | |
| 6,905,431 B2 | 6/2005 | Pearce et al. | |
| 6,909,220 B2 | 6/2005 | Chen | |
| 6,951,591 B2 | 10/2005 | Mortellite et al. | |
| 7,015,155 B2 | 3/2006 | Zhou et al. | |
| 7,067,583 B2 | 6/2006 | Chen | |
| 7,081,498 B2 | 7/2006 | Moeller et al. | |
| 7,093,316 B2 | 8/2006 | Chen | |
| 7,093,599 B2 | 8/2006 | Chen | |
| 7,105,607 B2 | 9/2006 | Chen | |
| 7,193,002 B2 | 3/2007 | Chen | |
| 7,202,297 B2 | 4/2007 | De Keyzer et al. | |
| 7,222,380 B2 | 5/2007 | Chen | |
| 7,226,484 B2 | 6/2007 | Chen | |

(Continued)

FOREIGN PATENT DOCUMENTS

EP  0673 970 A1  9/1995
JP  64-043515  2/1989

(Continued)

OTHER PUBLICATIONS

Office Action issued Aug. 4, 2015 in Japanese Patent Application No. 2013-554541 (with English translation).
Office Action issued Dec. 7, 2015 in Chinese patent Application No. 201280008758.9 (with English translation).
2007 Eastman presentation entitled "Eastman—Additives to Optimize Performance and Processability".
Patent Examination Report dated Mar. 13, 2015, in Australian Patent Application No. 2012217900.
Office Action Issued in Chinese application No. 201280008758.9, dated Nov. 24, 2014.
Supplementary European Search Report issued Aug. 22, 2014, in European Application No. 12746489.9 (with Englishlanguage Translation).

(Continued)

*Primary Examiner* — Jim J Seidleck
*Assistant Examiner* — Deve E Valdez
(74) *Attorney, Agent, or Firm* — Oblon, McClelland, Maier & Neustadt, L.L.P.

(57) ABSTRACT

An elastomeric composition, and method of making the same, useful for forming thin films and sheets, comprising 55-60% hydrogenated SEEPS having a number average molecular weight of 90,000 to 100,000, 7-12% polystyrene, 15-30% oil, and 5 to 20% of an aliphatic hydrogenated hydrocarbon resin.

8 Claims, No Drawings

(56) References Cited

U.S. PATENT DOCUMENTS

| | | |
|---|---|---|
| 7,268,178 B2 | 9/2007 | Frei |
| 7,288,590 B2 | 10/2007 | Lechat et al. |
| 7,309,524 B2 | 12/2007 | Krawinkel et al. |
| 7,445,831 B2 | 11/2008 | Ashraf et al. |
| 7,459,494 B2 | 12/2008 | Hamersky et al. |
| 7,622,176 B2 | 11/2009 | Bardiot et al. |
| 7,645,507 B2 | 1/2010 | Vermunicht et al. |
| 7,655,720 B2 | 2/2010 | He et al. |
| 7,674,733 B2 | 3/2010 | Wu et al. |
| 7,717,893 B2 | 5/2010 | Hird et al. |
| 2002/0001707 A1 | 1/2002 | Zhang et al. |
| 2002/0089087 A1 | 7/2002 | Mushaben |
| 2003/0017345 A1 | 1/2003 | Middlesworth et al. |
| 2003/0083422 A1 | 5/2003 | Chen |
| 2003/0219612 A1 | 11/2003 | Massey |
| 2004/0005834 A1 | 1/2004 | Zhou et al. |
| 2004/0048018 A1 | 3/2004 | Pearce |
| 2004/0077759 A1 | 4/2004 | Bardiot |
| 2004/0082718 A1 | 4/2004 | Chan et al. |
| 2004/0116582 A1 | 6/2004 | De Keyzer et al. |
| 2004/0241372 A1 | 12/2004 | Krawinkel |
| 2004/0250952 A1 | 12/2004 | Lechat |
| 2004/0254277 A1 | 12/2004 | Shelton et al. |
| 2005/0096416 A1 | 5/2005 | Zhou et al. |
| 2006/0079617 A1 | 4/2006 | Kappes et al. |
| 2006/0194493 A1 | 8/2006 | Cheney et al. |
| 2007/0037907 A9 | 2/2007 | Zhou et al. |
| 2007/0066753 A1* | 3/2007 | Ehrlich .......... C08F 297/04 525/89 |
| 2007/0088116 A1 | 4/2007 | Abba et al. |
| 2007/0092722 A1 | 4/2007 | Vermunicht et al. |
| 2007/0116854 A1 | 5/2007 | Taylor et al. |
| 2007/0123635 A1 | 5/2007 | Shelton et al. |
| 2007/0142521 A1 | 6/2007 | Brahms |
| 2007/0212317 A1 | 9/2007 | Atis et al. |
| 2007/0238835 A1 | 10/2007 | Chen |
| 2007/0258924 A1 | 11/2007 | Bui et al. |
| 2007/0258925 A1 | 11/2007 | Bui et al. |
| 2007/0258932 A1 | 11/2007 | Bui et al. |
| 2007/0259597 A1 | 11/2007 | Wong et al. |
| 2007/0299195 A1 | 12/2007 | de Keyzer |
| 2008/0064808 A1 | 3/2008 | Zhou et al. |
| 2008/0214078 A1 | 9/2008 | Vanmarcke et al. |
| 2009/0008026 A1 | 1/2009 | Kopf |
| 2009/0018253 A1 | 1/2009 | Thomas |
| 2009/0247688 A1 | 10/2009 | Jogo et al. |
| 2009/0258210 A1 | 10/2009 | Iyad et al. |
| 2009/0264580 A1 | 10/2009 | Abba et al. |
| 2013/0324656 A1 | 12/2013 | Jogo et al. |

FOREIGN PATENT DOCUMENTS

| | | |
|---|---|---|
| JP | 10017716 | 1/1998 |
| JP | 10025366 | 1/1998 |
| JP | 2777239 | 7/1998 |
| JP | 2000256684 | 9/2000 |
| JP | 2001081424 | 3/2001 |
| JP | 2002265748 | 9/2002 |
| JP | 2003-509565 | 3/2003 |
| JP | 2007-84821 | 4/2007 |
| JP | 2007091794 | 4/2007 |
| WO | 95/03447 | 2/1995 |
| WO | 9630419 | 10/1996 |
| WO | WO 01/19920 A1 | 3/2001 |
| WO | 02/057076 | 7/2002 |
| WO | WO 2007/119390 A1 | 10/2007 |
| WO | WO2012112500 A1 | 8/2012 |
| WO | WO2012112501 A1 | 8/2012 |

OTHER PUBLICATIONS

Extended European Search Report issued Aug. 5, 2014, in European Application No. 12746489.9 (with English-language Translation).

International Search Report and Written Opinion of the International Searching Authority issued May 30, 2012 in PCT/US12/25016.

Adel F. Halasa, et al., "Multiple Glass Transition Terpolymers of Isoprene, Butadiene, and Styrene", Rubber Chemistry and Technoogy, vol. 83, No. 4, (2010), pp. 380-390.

Eastman Regalrez, "hydrocarbon resins—Introduction", http://web.archive.org/web/20080723120632/http://www.eastman.com/Brands/Regalrez/Introduction/introduction.htm, Jul. 23, 2008, 2 pages.

Office Action issued on Jun. 6,2016 in European Patent Application No. 12 746 489.9.

Office Action issued Jun. 7, 2016 in Japanese Patent Application No. 2013-554541 (with English language translation).

* cited by examiner

ELASTOMERIC FORMULATIONS USEFUL IN FILMS AND SHEETS

CROSS REFERENCE TO RELATED APPLICATIONS

This application is a continuation application of prior U.S. application Ser. No. 13/396,107, filed Feb. 14, 2012, the disclosure of which is incorporated herein by reference in its entirety. The parent application claims priority to U.S. Provisional Application No. 61/442,593, filed Feb. 14, 2011, the disclosure of which is incorporated herein by reference in its entirety.

BACKGROUND OF THE INVENTION

Field

This application relates to elastomeric formulations suitable for use in thin films and sheets.

Description of the Related Art

Elastomeric materials have long been used in a variety of fields, including such fields as diapers. In the field of diapers, elastomeric materials have been used in several parts of the diaper, including both elastic cuffs around the waist and legs as well as the adhesive tabs used to fasten the diaper around the torso of a child. Both the body and tab portions of the diaper utilize elastomeric films. Films in elastic portions of products such as diapers may be exposed to extended periods of mechanical stress as well as elevated temperatures due to their close proximity to the body.

These films may include several primary components. The first component is typically a rubber or rubber-like block copolymer, such as those sold by Kuraray America, Inc. (Pasadena, Tex.) as Septon® 4000 series polymers. Septon polymers are S-E-EP-S polymers (styrene-ethylene-ethylene/propylene-styrene) that are hydrogenated styrenic block co-polymers with a mid block derived from a mixture of isoprene and butadiene. The second component is oil which is a plasticizer that helps make the composition softer. A third component such as polypropylene, polystyrene, and other polymers may also be included. Similarly, a wide variety of other additives may also be included in such compositions.

U.S. Publication No. 2009/0018253 discloses thermoplastic elastomer compositions which blend thermoplastic elastomers with certain performance additives. The '253 publication particularly discloses the use of styrenic block copolymers such as styrene-ethylene-butylene-styrene (SEBS), styrene-butadiene-styrene (SBS), styrene-isoprene-styrene (SIS), and styrene-ethylene-propylene-styrene (SEPS); and its blends with polyolefins (especially polypropylene), ethylene propylene dienemonomer (EPDM) rubber, and blends of polyolefins and EPDM rubber. The '253 publication also discloses performance additives, including both aliphatic and aromatic additives. These compositions were in many cases also mixed with oil and reportedly provided improved mechanical properties and processability. However, the '253 publication does not describe particular applications such as films, does not describe the use of SEEPS polymers, and does not does not describe the use of vinylarene resins (such as polystyrene) in combination with the block copolymers and additives.

In another known composition disclosed in U.S. Pat. No. 6,410,129, elastomeric films are disclosed which are made of three primary elements. These include Septon® 4033, oil, and polystyrene. In one exemplary embodiment of U.S. Pat. No. 6,410,129, the composition of a thin film includes 55% Septon 4033®, 15% polystyrene PS210, and 30% Drakeol® mineral oil. However, the elastomeric materials used to make these films are relatively difficult to process, may delaminate from adjacent layers when used in products such as diapers, and may gradually tear under stress over time during the life of a product such as diapers. The ability to resist such tearing is a property referred to as "slow tear resistance."

SUMMARY

It would be advantageous to improve upon known elastomeric compositions used in thin films and sheets in order improve the ability to process films, improve tear resistance, and improve adhesion.

It has been found that by making compositions using a modified version of Septon® 4033 such as JL-014, reducing the amount of oil, and/or adding particular tackifiers (especially Regalite® R1125 available from Eastman Chemical Co.), improvements can be made in the ability to process films, improve adhesion/delamination, and increase slow tear resistance. In preferred embodiments, the compositions are used to form thin films or sheets comprising 55-60% Septon 4033® or JL-014, 7-12% polystyrene, 15-30% oil, and 5 to 20% Regalite R1125®. In further preferred embodiments, the compositions comprise 55-60% Septon 4033® or JL-014, 7-10% polystyrene, 15-20% oil, and 10 to 20% Regalite R1125®

DETAILED DESCRIPTION OF THE PREFERRED EMBODIMENTS

A more complete appreciation of the invention and many of the attendant advantages thereof will be readily obtained as the same becomes better understood by reference to the following detailed description.

Polymers form the first element of the preferred elastomeric compositions. As stated previously, these polymers may include Septon® polymers which are S-E-EP-S polymers (styrene-ethylene-ethylene/propylene-styrene) that are hydrogenated styrenic block co-polymers with a mid block derived from a mixture of isoprene and butadiene. Applicants have discovered that by manipulating the mid-block of the SEEPS polymers used in thin film compositions, the properties in films that include the SEEPS polymers can be changed.

Preferably, the Septon® SEEPS hydrogenated block copolymers have a midblock that is at least 95% hydrogenated, more preferably at least 98% hydrogenated. Preferably, the Septon® SEEPS polymers have a number average molecular weight of 75,000 to 125,000, preferably, 80,000 to 115,000 and most preferably 90,000 to 100,000.

Preferably the Septon SEEPS polymers are approximately 30% polystyrene and the midblock comprises the remaining approximately 70% (weight %).

Preferably, the Septon® SEEPS polymers (with the exception of modified Septon 4033® polymers discussed below) have a mass ratio of isoprene to 1,3 butadiene from 50.1/49.9 to 59.9/40.1. This range includes all values and subvalues therebetween. Preferably the isoprene/butadiene mass ratio is from 54/46 to 56/44, more preferably the mass ratio of isoprene to 1,3 butadiene is 55/45.

Particularly useful hydrogenated polymers include Septon 4033®, JL-014, and JL-007 available from Kuraray America, Inc. in Pasadena Tex. JL-014 and JL-07 may each be referred to as a "modified Septon 4033" polymer. The molecular weight of Septon 4033 and the modified Septon 4033® polymers are substantially identical. However, the modified Septon 4033® polymers provide improved processing benefits not available with Septon 4033®.

The modified Septon® polymers preferably have a crystallization peak temperature of the hydrogenated block polymer from −3° C. to 15° C., and more preferably between 0° C. and 15° C. The modified Septon® polymers preferably have a mass ratio of isoprene to 1,3 butadiene from 46/54 to 44/56. This range includes all values and subvalues therebetween. The modified Septon® polymers more preferably have a mass ratio of isoprene to 1,3 butadiene of 45/55. Further discussion of modified Septon 4033 polymers is found in Japanese Patent Application No. 2011-028767, (inventors Yousuke Jogo, Nobuhiro Moriguchi, and Kenji Shachi) filed Feb. 14, 2011, which is incorporated by reference in its entirety.

Oil forms a second element of the preferred elastomeric compositions. In preferred embodiments oils include mineral oils such as Drakeol 600, Hydrobrite 550, and Krystol 550.

Styrene forms a third element of the preferred elastomeric compositions. Polystyrene may suitably be a general purpose polystyrene such as Crystal PS 3510 and Crystal PS 3190 available from INEOS NOVA LLC. Even small changes in polystyrene content, such as 2%, can greatly affect the processability and other properties of the resulting formulations.

Tackifier. Tackifiers are also particularly useful in the present invention. Particularly useful tackifiers include Regalite® R1125 (R1125) and Regalrez® R1126 (R1126) available from Eastman Chemical Company in Kingsport, Tenn. Regalite® R1125 and Regalrez® R1126 are aliphatic hydrogenated hydrocarbon resins. R1125 reportedly has a typical glass transition temperature ($T_g$° C.) of 70 and a number average molecular weight of 700. R1126 reportedly has a typical glass transition temperature ($T_g$° C.) of 67. See, Elastomers Technical Tip TT-103, Eastman™ performance additives and polymers. Preferably, aliphatic hydrogenated hydrocarbon resins have a glass transition temperature ($T_g$° C.) of 65-75° C. and a number average molecular weight of about 700 to 800. Alternatively, Krystalex or Endex may be used in the formulation. The use of tackifiers, in addition to providing improved processability, also surprisingly allows for a decrease in the styrene content in the formulation which in turn helps with improving tear resistance and further improving processability.

Other additives. Various other additives may be added in accordance with the invention.

Formulations according to the invention may advantageously include antioxidants, such as Irganox 1010 (Pentaerythritol tetrakis(3-(3,5-di-tert-butyl-4-hydroxyphenyl) propionate). Preferably, the formulations comprise 0.01 to 0.1%, more preferably 0.03 to 0.07% antioxidant. More preferably, the formulations comprise 0.05% antioxident.

Formulations according to the invention may also include slip agents. Suitable slip agents include erucamide. Preferably, the formulations comprise up to 0.4% slip agent, more preferably 0.05 to 0.1% slip agent.

Other additives may include pigments, fillers, UV stabilizers, and/or antiblocking agents as desired for a particular application.

In general, films made in accordance with the present invention typically have a thickness of 2 to 10 mils, more preferably 2-5 mils or 6-8 mils. The materials may also be formed into sheets. Sheets may have a thickness ranging from 10 mils to 30 mils or more.

Example Formulations. Twelve exemplary compositions were prepared and the formulation of each composition is described in Examples 1-12 in Table I. Examples 1-10 and 12 were compared against Example 11, Example 11 being a known composition. The numbers recited in Table I refer to the weight percent of each element of the composition.

TABLE I

| Material | \multicolumn{12}{c}{Example No.} |
|---|---|---|---|---|---|---|---|---|---|---|---|---|
|  | 1 | 2 | 3 | 4 | 5 | 6 | 7 | 8 | 9 | 10 | 11 | 12 |
| JL-007 | 55 | 60 | 60 | 60 |  |  | 55 |  |  | 60 |  | 56 |
| JL-014 |  |  |  |  |  | 55 |  |  | 60 |  |  |  |
| Septon ® 4033 |  |  |  |  | 55 |  |  | 60 |  |  | 56 |  |
| oil | 15 | 20 | 20 | 16 | 15 | 15 | 15 | 20 | 20 | 20 | 31 | 31 |
| Regalrez ® 1126 | 15 | 10 | 15 | 16 | 15 | 15 |  | 10 | 10 |  |  |  |
| Regalite ® 1125 |  |  |  |  |  |  | 15 |  |  | 10 |  |  |
| polystyrene | 15 | 10 | 5 | 8 | 15 | 15 | 15 | 10 | 10 | 10 | 13 | 13 |

Although not shown in Table I, modified versions of samples 4 and 9 were also made where Regalrez® 1126 was replaced by Regalite® 1125 and JL-007 was replaced by JL-0014.

The formulations according to the exemplary embodiments were made by extruding material in a Leistritz (27 mm) twin screw extruder with extended mixing sections. First, the oil and Septon polymers were mixed together, and then the polystyrene and tackifier were blended in to the mixture and fed to the extruder. Temperatures in the Leistritz extruder typically ranged from 170-230° C.

Subsequently, the compositions were formed into films having a thickness of 6-8 mils using a ThermoFisher 20 mm single screw machine. Temperatures in the ThermoFisher extruder typically ranged from 170-230° C.

Selected properties of films made from each of the exemplary compositions in Table I are shown in Table II.

TABLE II

| Property | \multicolumn{12}{c}{Example No.} |
|---|---|---|---|---|---|---|---|---|---|---|---|---|
|  | 5 | 1 | 6 | 7 | 8 | 2 | 9 | 10 | 3 | 4 | 11 | 12 |
| Ult. Stress | 3.01 | 3.71 | 2.76 | 2.68 | 1.69 | 2.27 | 2.11 | 2.25 | 1.83 | 1.93 | 1.27 | 1.59 |
| 1st unload | 2.32 | 2.76 | 2.15 | 2.11 | 1.51 | 1.84 | 1.76 | 1.85 | 1.54 | 1.61 | 1.19 | 1.36 |
| 2nd Ult. Stress | 2.72 | 3.27 | 2.51 | 2.44 | 1.57 | 2.09 | 1.96 | 2.08 | 1.7 | 1.8 | 1.22 | 1.5 |
| 2nd unload | 2.19 | 2.58 | 2.04 | 2.01 | 1.47 | 1.78 | 1.71 | 1.79 | 1.5 | 1.56 | 1.17 | 1.34 |
| total loss | 9.6 | 11.96 | 9.23 | 8.85 | 7.23 | 7.92 | 7.38 | 7.36 | 7.09 | 6.63 | 3.94 | 5.88 |
| 1st creep loss | 22.8 | 25.62 | 22.14 | 21.19 | 10.82 | 18.88 | 16.66 | 17.55 | 16.03 | 16.87 | 6.51 | 14.5 |
| 2nd creep loss | 19.5 | 21.09 | 18.52 | 17.75 | 6.04 | 15.12 | 12.74 | 14.07 | 11.87 | 13.62 | 4.16 | 11.01 |
| Youngs Mod. | 3.89 | 4.4 | 3.81 | 3.71 | 2.77 | 3.36 | 3.21 | 3.4 | 2.9 | 2.96 | 1.81 | 2.39 |
| tensile set (%) | 4.95 | 5.50 | 4.70 | 4.70 | 3.90 | 3.13 | 3.13 | 3.13 | 2.35 | 2.90 | 2.70 | 3.13 |

In determining the properties reported in Table II, the materials were put through two cycles of testing. In the first cycle, "Ult. Stress" refers to the ultimate tensile stress (units are MPa) after the material was stretched from 0 to 200% elongation. After a 30 second pause at 200% elongation, the stress was measured again ("1$^{st}$ unload"). The percentage loss during the first cycle is referred to as the "1$^{st}$ creep loss" measured after a further 60 seconds at 0% elongation ((1$^{st}$ unload/ult stress)×100%). Then the formulations were put through a second cycle of testing. Each formulation was again extended from 1 to 200% at which point the "2$^{nd}$ Ult." measurement was taken. After 30 seconds at 200% elongation the "2$^{nd}$ unload" measurement was made. The amount of loss during the second cycle was reported as the "2nd creep loss" measured after another 60 seconds at 0% elongation. The "total loss" was the percentage loss between the first and second Ult. Stress. The "tensile set" was tested by making scribe marks on each sample 2 inches apart and measuring the percentage gain in length after the two cycles. Some variation in tensile set readings may have occurred as some marks smeared during the testing and became difficult to read. The Young's Modulus was determined by calculating the slope of the stress/strain curve at the initial part of the first cycle when the film was being stretched from 0 to 200%. The Young's Modulus was calculated on an Instron tensile tester.

As can be seen from the above testing, in comparison to Example 11, preferred embodiments according to the invention had substantially better properties. As shown above, compositions having the tackifier and/or the modified Septon polymer have a higher Young's modulus than the known Example 11 composition. The higher Young's Modulus manifests itself in a higher tear strength. In addition, compositions having the tackifier and/or the modified Septon polymer can withstand higher stresses (though also higher losses) than the known Example 11 composition. Thus, the testing shows that films using the modified Septon 4033 polymers have significantly better properties than the comparative Example 11.

Significantly, a number of exemplary formulations were also tested for slow tear resistance. In Table III, 25.4 mm wide samples were prepared by forming a 2 mm notch in the middle of the side of each sample. Each sample was then stretched to 150% elongation at about 38° C. Time to failure (i.e., the sample tore completely) was measured. The time to failure (tf) is reported for each sample in Table III. For a more detailed description of the testing procedures used to determine slow tear resistance, refer to U.S. application Ser. No. 13/026,548, filed on Feb. 14, 2011, by Mansfield et al., and titled "Tear Resistant Laminate" and the discussion of the "Slow Tear Test (time to fail)."

TABLE III

| sample | tf (hr.) | tf (hr.) | tf (hr.) | average tf (hr.) |
|---|---|---|---|---|
| Ex. No. 4 | 7.03* | 22.22* | | 22.22 |
| Ex No. 7 | 12.78 | 16.67 | | 14.72 |
| Ex. No. 8 | 2.33 | 1.64 | 2.66 | 2.21 |
| Ex. No. 9 | 13.89 | 9.57 | | 11.73 |
| Ex. No. 10 | 10.56 | 16.67 | 10.56 | 12.59 |
| Ex. No. 11 | 0.32 | 0.26 | 0.19 | 0.26 |
| Ex. No. 12 | 0.85 | 1.01 | | 0.93 |

*indicates the test was stopped before specimen failure.
tf—time to failure

All of the examples reported in Table III showed a dramatic improvement in the period of time to failure as compared to the known comparative Example 11. Replacing Septon 4033 with a modified Septon more than tripled the average time to failure (compare Example 12 with Example 11). Those formulations using Septon 4033 where R1125 or R1126 was added lasted an average of more than 8 times as long to failure (compare Example 8 with Example 11). However, the most dramatic improvements in slow tear resistance appeared where both a modified Septon 4033® and R1125 and R1126 were used in combination. In these examples the time to failure took at least 20 to 85 times as long as comparative Example 11 (see Examples 4, 7, 9, and 10). All of these improvements were surprising and unexpected. Films having multi-hour time to failure as reported in Table III are particularly advantageous in applications such as the elastic in diapers where the material is under stress at above room temperature (such as approximately human body temperature) for many hours.

The examples according to the invention also show that it is advantageously and unexpectedly possible to lower the styrene content of the formulations compared to previously known formulations. In addition, in formulations that did not have either a modified Septon® polymer or R1125 or R1126 tackifier, films of less than 5 mils in thickness could not be easily made using the extruders discussed herein.

Obviously, numerous modifications and variations of the present invention are possible in light of the above teachings. It is therefore to be understood that within the scope of the appended claims, the invention may be practiced otherwise than as specifically described herein.

We claim:

1. An elastomeric composition, comprising:
   55-60% by weight hydrogenated isoprene-1,3-butadiene (SEEPS) block copolymer;
   7-12% by weight polystyrene;
   15-20% by weight mineral oil; and
   5-20% by weight of an aliphatic hydrogenated hydrocarbon resin;
   wherein
   a mass ratio of isoprene to 1,3-butadiene in the SEEPS block copolymer is from 54/46 to 56/44,
   a number average molecular weight of the SEEPS block copolymer is about 90,000 to 100,000, and
   the % by weight values are relative to a total weight of the composition.

2. The elastomeric composition of claim 1 wherein a glass transition temperature ($T_g$° C.) of the aliphatic hydrogenated hydrocarbon resin is 65-75° C. and a number average molecular weight of the aliphatic hydrogenated hydrocarbon resin is about 650 to 800.

3. The elastomeric composition of claim 1, wherein the content of the mineral oil is from 16 to 20% by weight, the content of polystyrene is from 8 to 10% by weight, and the content of the aliphatic hydrogenated hydrocarbon resin is 10 to 16% by weight.

4. A method to prepare an elastomeric film comprising the composition of claim 1, the method comprising:
   mixing the mineral oil and the SEEPS block copolymer;
   blending the polystyrene and aliphatic hydrogenated hydrocarbon resin into the mineral oil SEEPS mixture to obtain an extrusion feed;
   supplying the extrusion feed to an extruder; and
   extruding the extrusion feed to obtain the elastomeric film.

5. The method to prepare an elastomeric film of claim 1, wherein a glass transition temperature ($T_g$° C.) of the aliphatic hydrogenated hydrocarbon resin is 65-75° C. and a number average molecular weight of the aliphatic hydrogenated hydrocarbon resin is about 650 to 800.

6. An elastomeric film obtained according to the method of claim 4.

7. The elastomeric film of claim 6, wherein a thickness on the film is from 2 to 10 mils.

8. An elastomeric sheet comprising the composition of claim 1, wherein a thickness of the sheet is from greater than 10 to 30 mils.

\* \* \* \* \*